Patented Dec. 27, 1949

2,492,692

UNITED STATES PATENT OFFICE 2,492,692

DIOXOLANE COMPOUND

Nathan L. Drake, College Heights, Md., and Wilbur J. Shenk, Cleveland, Ohio, assignors to the United States of America as represented by the Secretary of the Army No Drawing. Application January 11, 1949, Serial No. 70,389

5 Claims. (Cl. 260—338)

This invention relates to insect repellents.

We have found that the application of the ethyl ester of 4-methoxymethyl-2-methyl-1,3-dioxolane-2-propionic acid to the human skin or to a fabric affords effective protection against insect bites, by repelling insects, particularly *Aedes aegypti* and *Anopheles quadrimaculatus*.

A number of tests to measure the repellency of the ethyl ester of 4-methoxymethyl-2-methyl-1,3-dioxolane-2-propionic acid against *Aedes aegypti* was conducted by smearing the compound on the arms of test personnel, who then thrust their arms into cages containing *Aedes aegypti*. The arms were exposed for 30-minute intervals at 3 minutes each until the first insect bite.

Tests to measure the repellency of fabrics against *Aedes aegypti* were conducted by uniformly impregnating mercerized cotton hose with the compound at a rate equivalent to 3.3 gms. per sq. ft., drawing the dried hose over the arms of test personnel, who then thrust their covered arms into cages containing *Aedes aegypti* for 1 to 2 minutes. If no bites or less than 5 bites were received, the tests were repeated each successive day until 5 or more bites during one exposure were received.

It was found that the application of the ethyl ester of 4-methoxymethyl-2-methyl-1,3-dioxolane-2-propionic acid affords protection against *Aedes aegypti* for an average of 247 minutes. Against *Anopheles quadrimaculatus*, an average repellency time of 45 minutes was noted in analogous tests.

It was found that fabric impregnated with the ethyl ester of 4-methoxymethyl-2-methyl-1,3-dioxolane-2-propionic acid remained repellent to *Aedes aegypti* for over 10 successive days.

The ethyl ester of 4-methoxymethyl-2-methyl-1,3-dioxolane-2-propionic acid is prepared by reacting about 27 gms. of alpha-monomethyl ether of glycerol with about 42 gms. of ethyl levulinate in the presence of benzene (e. g., 40 gms.) and a catalyst such as toluenesulfonic acid. The reaction product is washed, and a yield of about 47 gms. of the ethyl ester of 4-methoxymethyl-2-methyl-1,3-dioxolane-2-propionic acid, a liquid boiling at 85–87° C. at 0.2 mm. pressure, is obtained.

For ease of application to the skin, the ethyl ester of 4-methoxymethyl-2-methyl-1,3-dioxolane-2-propionic acid may be incorporated in a suitable inert liquid or solid carrier such as mineral oil, alcohol, petrolatum, etc. For ease and uniformity of application to the fabric, the ethyl ester of 4-methoxymethyl-2-methyl-1,3-dioxolane-2-propionic acid may be applied to the fabric in an inert solvent, such as alcohol, ether, etc.

Having thus described our invention, we claim:

1. The ethyl ester of 4-methoxymethyl-2-methyl-1,3-dioxolane-2-propionic acid.

2. A process of making the ethyl ester of 4-methoxymethyl-2-methyl-1,3-dioxolane - 2 - propionic acid, comprising reacting the alpha-monomethyl ether of glycerol and ethyl levulinate.

3. A process of making the ethyl ester of 4-methoxymethyl-2-methyl-1,3-dioxolane - 2 - propionic acid, comprising reacting the alpha-monomethyl ether of glycerol and ethyl levulinate in the presence of toluenesulfonic acid.

4. A process of making the ethyl ester of 4-methoxymethyl - 2 - methyl-1,3-dioxolane-2-propionic acid, comprising reacting the alpha-monomethyl ether of glycerol and ethyl levulinate in the presence of benzene.

5. A process of making the ethyl ester of 4-methoxymethyl-2-methyl-1,3-dioxolane - 2 - propionic acid, comprising reacting the alpha-monomethyl ether of glycerol and ethyl levulinate in the presence of toluenesulfonic acid and benzene.

NATHAN L. DRAKE.
WILBUR J. SHENK.

No references cited.